United States Patent

Udagawa

[19]

[11] Patent Number: 6,002,379
[45] Date of Patent: Dec. 14, 1999

[54] GLASS UNIT

[75] Inventor: Tetsuo Udagawa, Omiva, Japan

[73] Assignee: Fuji Photo Optical Co., Ltd., Saitama, Japan

[21] Appl. No.: 08/698,939

[22] Filed: Aug. 16, 1996

[30] Foreign Application Priority Data

Oct. 20, 1995 [JP] Japan .................................. 7-297634

[51] Int. Cl.[6] .................................................. G09G 5/00
[52] U.S. Cl. ............................. 345/9; 340/995; 356/138
[58] Field of Search ..................... 345/7, 8, 9; 340/995; 701/213; 342/457; 356/138

[56] References Cited

U.S. PATENT DOCUMENTS

| | | | |
|---|---|---|---|
| 4,949,089 | 8/1990 | Ruszkowski, Jr. | 342/52 |
| 5,026,158 | 6/1991 | Golubic | 356/252 |
| 5,262,838 | 11/1993 | Tocher | 356/16 |
| 5,396,431 | 3/1995 | Shimizu et al. | 340/995 |
| 5,483,456 | 1/1996 | Kuwahara et al. | 340/995 |
| 5,617,319 | 4/1997 | Arakawa et al. | 340/995 |
| 5,623,335 | 4/1997 | Bamberger | 356/5.01 |
| 5,815,411 | 9/1998 | Ellenby et al. | 345/9 |
| 5,819,199 | 10/1998 | Kawai et al. | 340/995 |
| 5,825,340 | 10/1998 | Torizuka et al. | 345/8 |

FOREIGN PATENT DOCUMENTS 4-354485  12/1992  Japan .

OTHER PUBLICATIONS

Journal of the Society of Instrument and Control Engineers, vol. 33, No. 8, Aug. 1994, Japan (in Japanese language and in English translation).

*Primary Examiner*—Matthew Luu
*Attorney, Agent, or Firm*—Ronald R. Snider; Snider & Associates

[57] ABSTRACT

A glass unit such as a binocular or monocular in which an object to be observed is viewed under magnification is made to display a map image, whereby the observer's own position can be specified on the map image without an atlas being opened. Based on a self-position data input from a GPS unit (21), a CPU (31) transmits map image information near its own position from a topographic map database (23) to a CG buffer (39) by way of a memory (25). On the other hand, based on the self-position data, a mark or character indicative of its position on the map image is generated by a mark character generating unit (35) so as to be superimposed onto the map image from the CG buffer (39), whereby a composite image thus formed is displayed by an LCD within a housing (10) so as to be viewed within the visual field of the glass unit.

8 Claims, 3 Drawing Sheets

GLASS UNIT

RELATED APPLICATIONS

This application claims the priority of Japanese Patent Application No. 7-297634 filed on Oct. 20, 1995, which is incorporated herein by reference.

BACKGROUND OF THE INVENTION

1. Field of the Invention

The present invention relates to a glass unit in which a binocular, a monocular, or the like (referred to as "binocular or the like" hereinafter) for viewing, under magnification, an object to be observed is provided with a special function.

2. Description of the Prior Art

For example, there is a case where it is necessary to recognize one's own current position during mountain climbing. In such a case, a topographic map (atlas) of the neighborhood is opened, a landscape nearby which can become a landmark is observed with a binocular or the like, the direction of this landscape is specified with a magnet or the like, and then, based on such information, one's own current position is heuristically specified on the topographic map.

It is, however, troublesome to open a topographic map every time one's own position is to be specified. Also, there are often cases where it is difficult to open a topographic map (atlas) itself, for example, when the footing is unstable or wind is strong.

In such cases, it will be very convenient if one's own position can be visually specified without a topographic map (atlas) being opened.

SUMMARY OF THE INVENTION

In view of such circumstances, the object of the present invention is to provide a glass unit which can visually specify its own current position without a topographic map (atlas or the like) being opened.

The glass unit of the present invention is a glass unit for viewing, under magnification an object to be observed and comprises:

a memory which stores digital map information, a CPU which reads out the map information within the memory, and a display means which shows the map information read out by the CPU.

This glass unit may be of a binocular type or a monocular type. The above-mentioned display means may display the map information in one of the visual fields of the binocular, may selectively display the map information and an image of the object to be observed within the visual field of the binocular or monocular, or may display the map information and the image of the object to be observed within the visual field of the binocular or monocular in an overlapping state.

The glass unit may further comprise a means for detecting the azimuth of the direction to which the glass unit is directed, such that the azimuth information obtained thereby is displayed in conjunction with the map information displayed within the visual field of the glass unit. Also, it may further comprise a self-position detecting means for detecting its own current position such that the self-position information obtained thereby is displayed in conjunction with the map information displayed within the visual field of the glass unit. Alternatively, it may further comprise both means for detecting the azimuth of the direction to which the glass unit is directed and self-position detecting means for detecting its own current position such that the self-position information and target direction information obtained by these means are displayed in conjunction with the map information displayed within the visual field of the glass unit.

When the glass unit has a means for detecting the azimuth of the direction to which the glass unit is directed, and the azimuth information obtained thereby is displayed in conjunction with the map information displayed within the visual field of the glass unit, it may further comprise a means for detecting altitude and a means for detecting angle of depression and elevation. When the glass unit has both means for detecting the azimuth of the direction to which the glass unit is directed and self-position detecting means for detecting its own current position, and the one's own position information and target direction information obtained by these means are displayed in conjunction with the map information displayed within the glass visual field, it may further comprise a means for detecting angle of depression and elevation.

DETAILED DESCRIPTION OF THE PREFERRED EMBODIMENTS

In the following, embodiments of the present invention will be explained.

Figure 1:
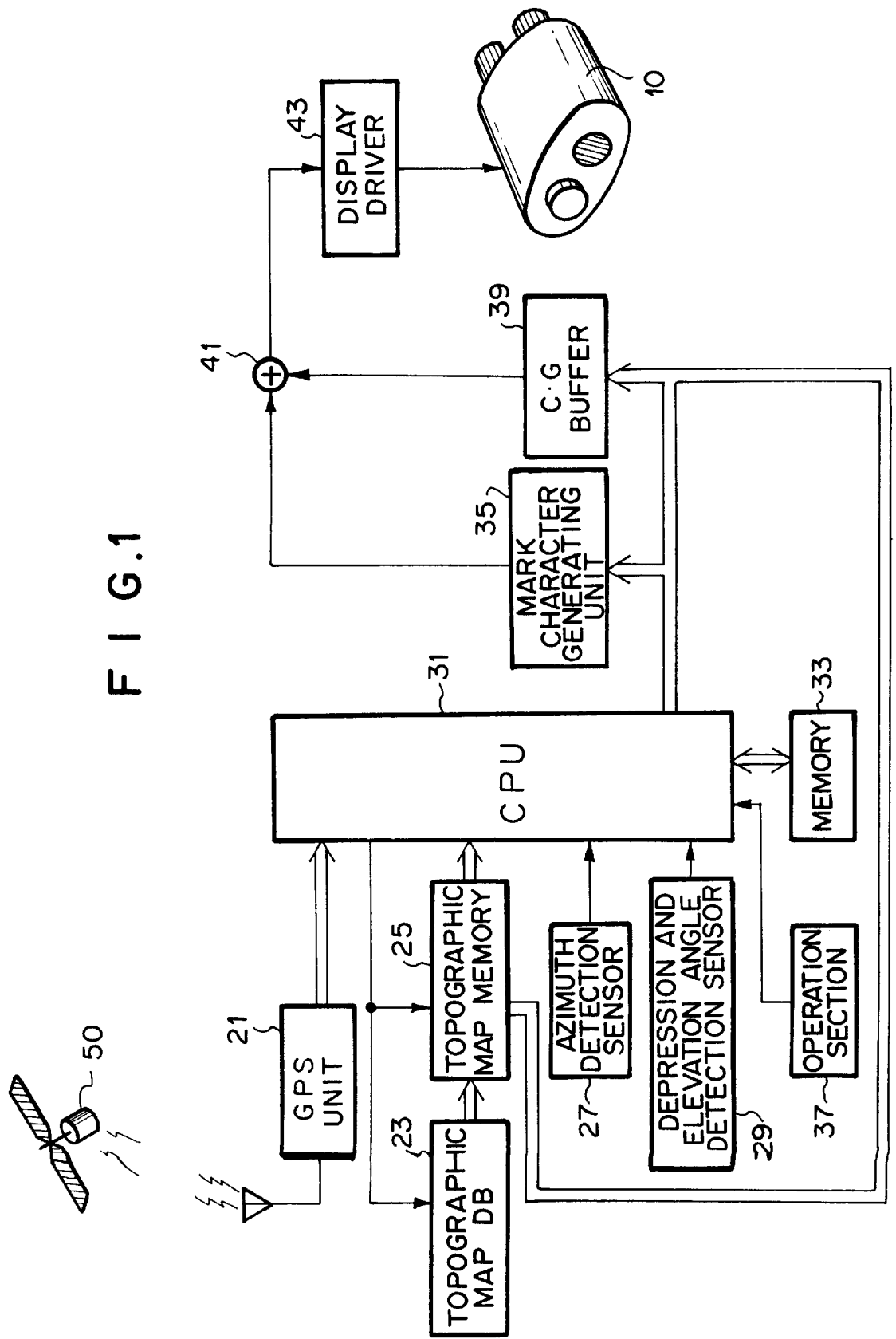
FIG. 1 is a block diagram showing a configuration of a glass unit in accordance with an embodiment of the present invention.

FIG. 1 is a block diagram showing a configuration of a glass unit in accordance with an embodiment of the present invention.

This glass unit is formed so as to have an outer shape of a binocular type in which an enlarged landscape can be observed with the right eye of an observer while a topographic map near the observer's own position can be viewed with the left eye. Though means indicated by individual blocks in FIG. 1 are installed within a housing 10 of the glass unit such that the topographic map image is displayed within the visual field of the left eye, they are depicted outside of the housing 10 in order to facilitate explanation.

As shown in FIG. 1, this glass unit comprises a GPS unit 21 which receives an electric wave signal from a GPS satellite 50; a topographic map database 23 stored in a CD-ROM, an IC card, or the like; a topographic map memory 25; an azimuth detection sensor 27 for detecting the azimuth of observing direction of the glass unit; a depression and elevation angle detection sensor 29 for detecting the angle of depression and elevation in the observing direction of the glass unit; a CPU 31 with an I/O function, which receives information from these means, subjects thus received information to a predetermined operation, and then outputs thus operated information; and a memory section 33 constituted by a ROM memory storing an operation program for the CPU 31 and a RAM memory storing various kinds of data. Also, connected to the CPU 31 is an operation section 37 by which an observer selects whether the information concerning the observer's own current position should be superimposed onto the map image or not, for example.

The glass unit further comprises a mark character generating unit 35 which generates a self-position mark or the like on the basis of the topographic map information and self-position information output from the CPU 31; a CG buffer 39 which temporarily stores image data selected from the CPU 31; a superimposing means 41 which superimposes the observer's own position mark or the like onto a predetermined position in the map image; and an LCD display driver 43 which drives a color LCD (color liquid crystal display panel which is not depicted in FIG. 1) on the basis of the map image signal.

The GPS unit 21 receives electric wave signals from a plurality of GPS satellites 50, computes its own current position (absolute coordinates of latitude, longitude, and altitude), and then transmits the self-position information obtained by this computation to the CPU 31.

Based on the self-position information from the CPU 31, the topographic map database 23 transmits, to the topographic map memory 25, a map image data corresponding to the current position.

The azimuth detection sensor 27 is, for example, a sensor such as an electronic compass which detects azimuth. It can easily detect the azimuth of the optical system of the glass unit in the direction of the optical axis.

The depression and elevation angle detection sensor 29 can easily detect the angle of depression and elevation of the optical system of the glass unit in the direction of the optical axis.

In response to an instruction from the CPU 31, the mark character generating unit 35 generates a video signal for displaying a predetermined mark at a position on the map image corresponding to its own current position, while generating a video signal for displaying respective value (character) data for the latitude, longitude, and altitude indicative of its own position.

In the following, the operation of this glass unit will be explained with reference to FIGS. 1 to 3.

First, the GPS unit 21 receives three or four waves of GPS electric waves from the GPS satellite 50; computes the latitude, longitude, and altitude of its own current position from thus received information; and then transmits thus computed self-position data to the CPU 31 per a predetermined time (e.g., per second).

Based on thus input self-position data, the CPU 31 retrieves, of a number of sectional topographic maps stored in the topographic map database 23, a sectional topographic map including the position corresponding to its own position and then, while capturing thus retrieved information data by way of the topographic map memory 25, transmits the map image data to the CG buffer 39.

To the CPU 31, input are the azimuth data in the direction currently being observed by the glass unit and the depression and elevation angle data which are respectively transmitted from the azimuth detection sensor 27 and the depression and elevation angle detection sensor 29.

Thereafter, the map data transmitted to the CG buffer 39 is transmitted to the display driver 45 as a map image signal.

Figure 2:
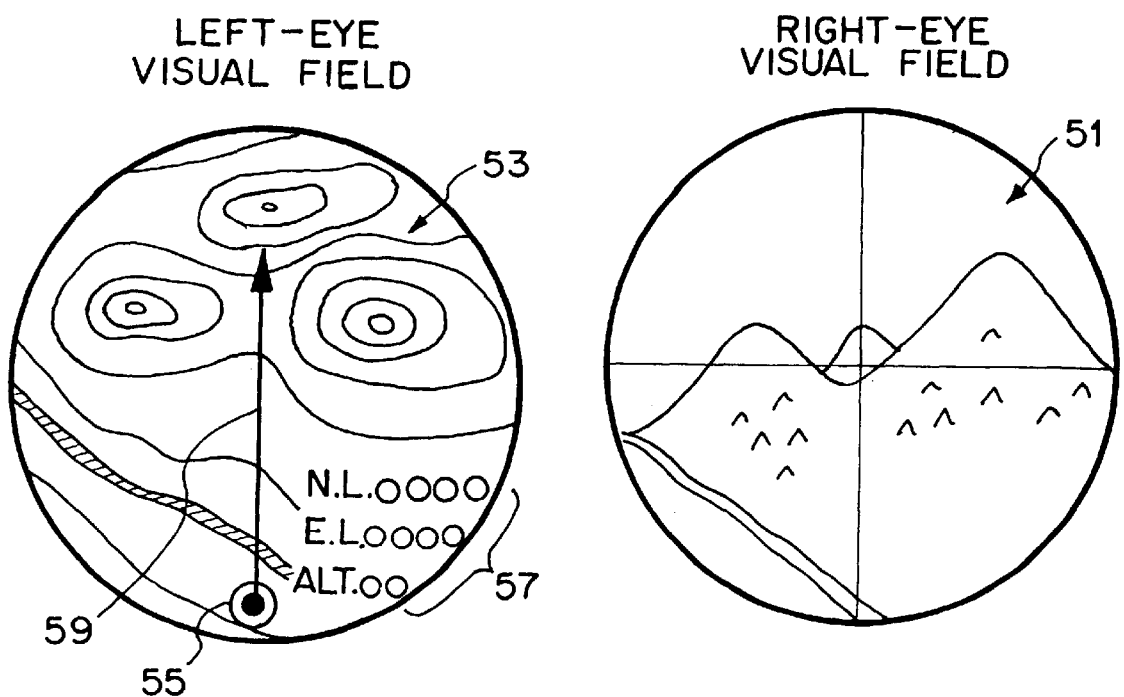
FIG. 2 is a view showing a landscape and a map image which are observed within visual fields of the glass unit shown in FIG. 1.

Based on thus input map image signal, the display driver 43 drives a color LCD (color liquid crystal display panel) 75 (see FIG. 3), which is disposed at a predetermined position within the housing 10, so as to display a color map image 53 on the LCD 75, whereby, as shown in FIG. 2, the map image corresponding to a landscape 51 seen within the right-eye visual field can be observed within the left-eye visual field.

When the observer operates the operation section 37 so as to effect an operation for displaying the observer's own current position by means of a mark and a character, the CPU 31 transmits an azimuth data to the mark character generating unit 35, while instructing the latter to generate an image signal for displaying each of a predetermined mark indicative of the observer's own current position, the latitude, longitude, and altitude values (characters) indicative of the observer's own current position, and an arrow indicative of the direction to which the glass unit is directed from the observer's own current position.

The image signal generated by the mark character generating unit 35 is combined with the map image signal from the CG buffer 39 at the superimposing means 41, whereby the mark, values (characters), and arrow are superimposed onto the map image displayed within the left-eye visual field.

Namely, as shown in FIG. 2, onto the map image 53 observed within the left-eye visual field, a mark 55 indicative of the position corresponding to the observer's own position, values 57 indicative of the latitude, longitude, and altitude of the observer's own position, and an arrow 59 indicative of the direction to which the glass unit is currently directed from the observer's own position are superimposed.

Accordingly, the observer's own position can be correctly (with an error of about 10 m) recognized on the map image, whereby the subsequent action can be easily determined. Also, unlike the prior art, it is unnecessary to open a topographic map and specify the observer's own position while investigating the azimuth by means of a magnet.

Further, as shown in FIG. 2, since the landscape positioned at the center (intersection of cross lines) in the right-eye visual field can be specified from the map image information positioned on the arrow 59 of the left-eye visual field, the name of the landscape or the like can be easily judged.

Also, in the case where ridges and valleys of mountains are complicated, for example, when the operation section 37 is operated such that the value of depression and elevation angle from the depression and elevation angle detection sensor 29 is superimposed onto the map image 53 within the left-eye visual field, the landscape 51 seen within the right-eye visual field can be specified more easily.

Figure 3:
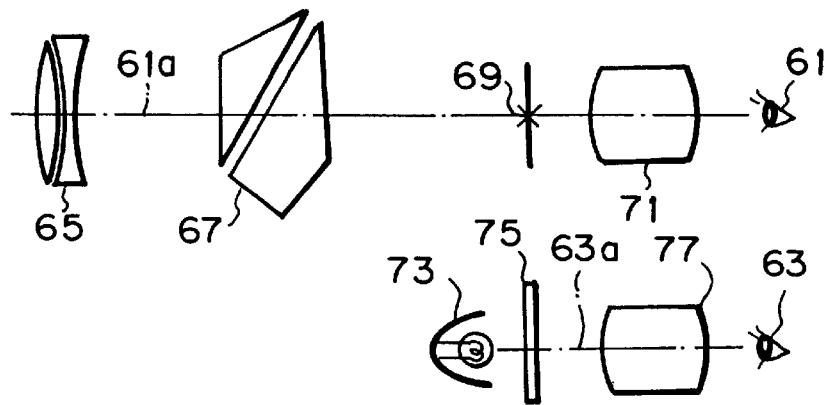
FIG. 3 is a schematic view showing optical systems of the glass unit shown in FIG. 1.

Here, the respective optical systems for the right eye and left eye within the housing 10 are configured as shown in FIG. 3.

Namely, the optical system for the right eye comprises an objective lens 65, an erect prism 67, and an ocular 71 which are disposed on a common optical axis 61a, such that an image of the observed landscape 51 formed at an imaging position 69 by the objective lens 65 and the erect prism 67 is enlarged by the ocular 71 and made incident on a right eye 61 of the observer. On the other hand, the optical system for the left eye comprises a back light 73, the LCD 75, and an ocular 77 which are disposed on a common optical axis 63a, such that the map image 53 on the LCD 75 illuminated with the back light 73 is enlarged by the ocular 77 and made incident on a left eye 63 of the observer. Here, the map image 53 displayed on the LCD 75 is generated as mentioned above.

Accordingly, as mentioned above, the observed landscape 51 is displayed within the right-eye visual field of the observer, while the map image 53 corresponding to the observed landscape 51 is displayed within the left-eye visual field.

Figure 4:
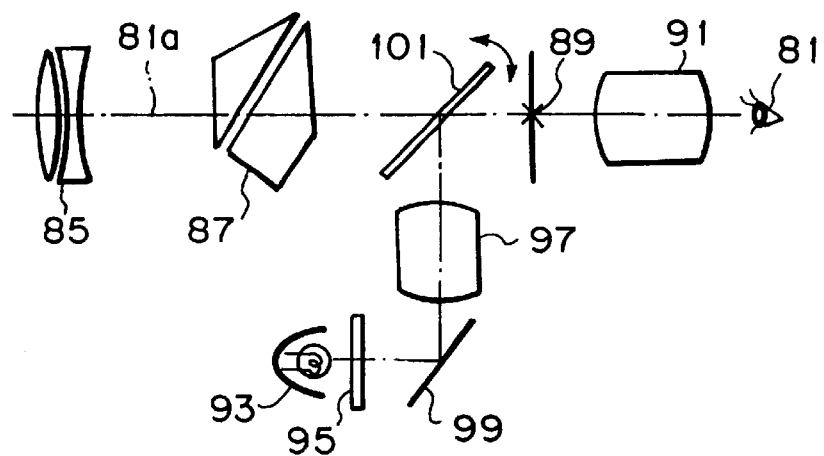
FIG. 4 is a schematic view showing a modified example of the optical systems shown in FIG. 3.

Here, as shown in FIG. 4, the optical system for the left eye within the housing 10 may be configured such that any of the image of the observed landscape 51 and the map image 53 is made incident on a left eye 81 as a movable mirror 101 is switched over. Namely, when the movable mirror 101 is disposed at the position shown in FIG. 4, the map image 53 on an LCD 95 illuminated with a back light 93 is reflected by a mirror 99 and the movable mirror 101 so as to form an image at an imaging position 89 by means of a lens 97 and then enlarged by an ocular 91 so as to be made incident on the left eye 81 of the observer. On the other hand, when the movable mirror 101 is rotated in the direction of arrow and retracted out of an optical axis 81a, the image of the observed landscape 51 formed at the imaging position 89 by an objective lens 85 and an erect prism 87 is enlarged by the ocular 91 and made incident on the left eye 81.

Accordingly, when the optical systems are constructed within the housing 10 as shown in FIG. 4, the external landscape can be observed three-dimensionally with both right and left eyes, and the image of the observed landscape 51 can be observed with the right eye while the map image 53 corresponding to the landscape 51 can be viewed with the left eye.

The movable mirror 101 may be switched over as the operation section 37 such as that shown in FIG. 1 is operated.

Figure 5:
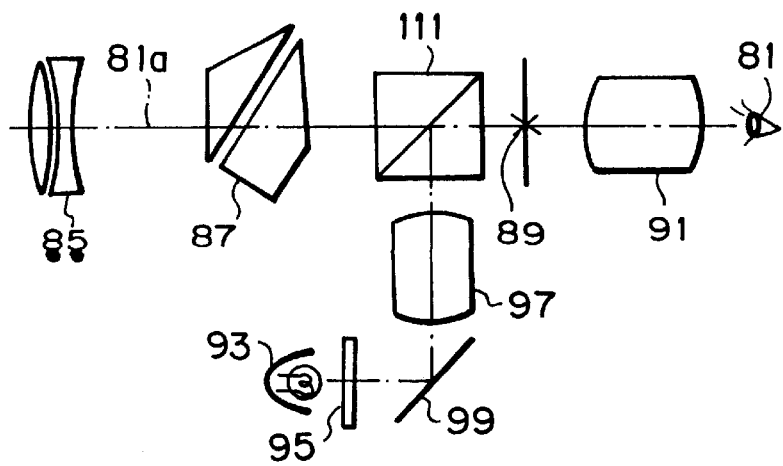
FIG. 5 is a schematic view showing another modified example of the optical systems shown in FIG. 3.

Alternatively, as shown in FIG. 5, when a half prism 111 is disposed in place of the above-mentioned movable mirror 101, the map image 53 can be seen with the left eye 81 as being overlapped with the image of the observed landscape 51.

Without being restricted to the embodiments mentioned above, the glass unit of the present invention can be modified in various manners. For example, though the map image is displayed within the left-eye visual field, it may be displayed within the right-eye visual field, of course.

Also, while the foregoing embodiments are configured as a binocular type, when the optical systems within the housing 10 are configured as shown in FIG. 4 or 5, a monocular type unit can be constructed.

Further, processing for detecting the observer's own current position by the GPS unit may be performed, for example, per minute, whereby, based on thus detected latitudes and longitudes, the locus of movement of the observer can be indicated in the map image displayed within the visual field of the glass unit.

A various kinds of map information can be adopted as the map information to be stored within the map database memory (CD-ROM, ID card, or the like). For example, 1:50,000 sectional topographic maps issued by Geographic Survey Institute of Japan may be used. Desirably, names of places have been written within the topographic map beforehand.

Also, means for displaying the map information may be attached to the outside of the housing for the glass unit, for example, onto the upper wall surface of the glass unit. In this case, a larger picture can be formed. Also, in this case, when the display means is formed collapsible, its portability becomes favorable.

Also the GPS unit may be omitted from the glass unit of the present invention. Namely, the glass unit may be configured such that, as a map image to be displayed in the display means, that of a desired area (where the observer is supposed to be at present) is selected according to the operation effected by the observer and then the observer's own current position is specified from thus selected map image and the landscape observed through the glass unit.

Further, for example, when azimuths of two spots, which can be specified on a map, observed through the glass unit are measured by the azimuth detection sensor, the difference between thus obtained two azimuths is computed, two cursor lines intersecting at thus computed angle are generated in the map image, and these cursor lines are positioned so as to respectively pass through these two points; the intersection between the cursor lines can be specified as the observer's own position. In this case, when the altitude information from the altitude detection sensor and the depression and elevation angle information from the depression and elevation angle detection sensor are further taken into account, thus specified observer's own position can have a higher accuracy.

Also, in place of the GPS unit, other self-position detecting means such as gyroscope may be used. Further, when the depression and elevation angle information from the depression and elevation angle detection sensor is obtained in the case where the glass unit already has a self-position detecting means such as GPS unit, the target position can be specified more easily. For example, when the position of a person adrift on the sea is to be specified from a helicopter, since the altitude of the person can be assumed to be 0 m above the sea level, the position (latitude and longitude) of the person can be easily specified from the self-position information from the self-position detecting means such as GPS unit and the above-mentioned depression and elevation angle information alone so as to be displayed in the display means.

The map image within the visual field of the glass unit may be displayed such that the north direction is always placed upward. Alternatively, the map image may be displayed as being rotated according to the direction of the glass unit such that the observed direction is placed upward.

Also, the observer's own position specified in the map image may be set such that it is located at an end portion of the visual field of the glass unit as shown in FIG. 2 or at the center portion thereof.

Though the image signal and LCD in the foregoing embodiments are assumed to handle color images, their configuration become simpler when they handle monochromatic images alone.

As explained in the foregoing, in accordance with the glass unit of the present invention, digital map information is read out from the memory such that a map image is displayed by the display means, whereby, while a landscape is observed, a position corresponding to this landscape can be specified in the map image displayed by the display means. Accordingly, without an atlas or the like being opened, the observer's own position can be specified.

Also, when the map image is displayed within the visual field of the glass unit, the observer's own position can be specified without the eyes being separated from the ocular portion of the glass unit.

Further, when the self-position information from the GPS unit is used, the operation for specifying the observer's own position while viewing the map image becomes unnecessary, whereby the observer's own position can be specified in the map image instantaneously with a high accuracy.

What is claimed is:

1. A glass unit for viewing under optical magnification, an object to be observed, said glass unit comprising:

a memory which stores digital map information, a CPU which reads out the map information within said memory, a first display means which shows the map information read out by said CPU and a second display means comprising an optical monocular visual display, wherein said glass unit combines the first display means map information and the second display means optical monocular visual display within different visual fields.

2. A glass unit according to claim 1, wherein said first display means displays, in an overlapping state within at least one visual field, said map information and an image of the object to be observed.

3. A glass unit according to claim 1, further comprising a self-position detecting means for detecting a current position of said glass unit, wherein, based on information about the position of said glass unit obtained by said detecting means, predetermined map information is selected from the map information within said memory.

4. A glass unit according to claim 1, further comprising a self-position detecting means for detecting a current position of said glass unit, wherein information about the position of said glass unit obtained by said detecting means is displayed in conjunction with the map information displayed by the first display means.

5. A glass unit according to claim 1, further comprising an azimuth detecting means for detecting azimuth of a direction to which said glass unit is directed, wherein azimuth information obtained by said azimuth detecting means is displayed in conjunction with the map information displayed by the first display means.

6. A glass unit according to claim 1, further comprising an azimuth detecting means for detecting azimuth of a direction to which said glass unit is directed and a self-position detecting means for detecting a current position of said glass unit, wherein information about the position of said glass unit and information about a target direction obtained by said self-position detecting means and azimuth detecting means are displayed in conjunction with the map information displayed by the first display means.

7. A glass unit according to claim 5, further comprising a means for detecting altitude and a means for detecting angle of depression and elevation.

8. A glass unit according to claim 6, further comprising a means for detecting angle of depression and elevation.

* * * * *